(12) United States Patent
Arreaza et al.

(10) Patent No.: US 12,158,354 B2
(45) Date of Patent: Dec. 3, 2024

(54) CONNECTED VEHICLE-BASED ROAD SURFACE QUALITY DETERMINATION

(71) Applicant: GM Global Technology Operations LLC, Detroit, MI (US)

(72) Inventors: Carlos Eduardo Arreaza, Oakville (CA); Amin Abdossalami, Markham (CA); Joseph K. Moore, Whitby (CA); Donald K. Grimm, Utica, MI (US); Fan Bai, Ann Arbor, MI (US); Harnit Kaur Anand, Troy, MI (US); Jinzhu Chen, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 325 days.

(21) Appl. No.: 17/550,524

(22) Filed: Dec. 14, 2021

(65) Prior Publication Data
US 2023/0184563 A1 Jun. 15, 2023

(51) Int. Cl.
*G01C 21/00* (2006.01)
*E01C 23/01* (2006.01)
(Continued)

(52) U.S. Cl.
CPC .......... *G01C 21/3815* (2020.08); *E01C 23/01* (2013.01); *G01C 21/3841* (2020.08); *G07C 5/02* (2013.01); *B60C 23/0488* (2013.01); *G01M 17/04* (2013.01); *G01P 3/00* (2013.01); *G07C 5/008* (2013.01)

(58) Field of Classification Search
CPC ............ G01C 21/3815; G01C 21/3841; G01C 21/3833; G01C 21/3822; E01C 23/01; G07C 5/02; G07C 5/008; B60C 23/0488; B60C 23/04; G01M 17/04; G01M 3/3272; G01M 3/04; G01P 3/00; B60T 2210/14; B60T 8/171; B60T 8/172; G01S 13/06; G01S 13/867; G01S 13/885; G01B 11/303; G01B 21/02
See application file for complete search history.

(56) References Cited

U.S. PATENT DOCUMENTS 4,670,852 A * 6/1987 Masaki ................... B60T 8/173
 701/76
10,821,968 B2 11/2020 Cho et al.
(Continued)

FOREIGN PATENT DOCUMENTS

CN 114506326 A 5/2022
DE 102021110962 A1 11/2021
(Continued)

*Primary Examiner* — Donald J Wallace
(74) *Attorney, Agent, or Firm* — Vivacqua Crane, PLLC

(57) ABSTRACT

A system comprises a computer including a processor and a memory. The memory includes instructions such that the processor is programmed to receive sensor data including wheel speed measurements, suspension displacement measurements, and tire leak detection data from a vehicle, estimate a rough road measurement based on a deviation of a wheel speed with respect to an average wheel speed and or based on suspension displacement sensor signals and generate temporal spatial map data indicative of a location and a roughness severity metric of a roadway portion based on the rough road measurement and tire leak detection data.

14 Claims, 7 Drawing Sheets

(51) Int. Cl.
 G07C 5/02      (2006.01)
 *B60C 23/04*      (2006.01)
 *G01M 17/04*     (2006.01)
 *G01P 3/00*       (2006.01)
 *G07C 5/00*       (2006.01)

(56) References Cited

U.S. PATENT DOCUMENTS

| | | | |
|---|---|---|---|
| 2005/0212666 A1* | 9/2005 | Kawazoe | G05D 1/0227 |
| | | | 340/436 |
| 2005/0246087 A1* | 11/2005 | Hommi | B60L 50/16 |
| | | | 701/72 |
| 2008/0059034 A1* | 3/2008 | Lu | B60W 40/101 |
| | | | 701/41 |
| 2008/0177437 A1* | 7/2008 | Asgari | B60W 50/045 |
| | | | 701/33.9 |
| 2015/0291177 A1 | 10/2015 | Lee | |
| 2015/0314663 A1* | 11/2015 | Rhode | B60G 17/0165 |
| | | | 701/37 |
| 2018/0105206 A1* | 4/2018 | Gullven | B60W 40/06 |
| 2019/0126712 A1* | 5/2019 | Miller, Jr. | B60G 17/01933 |
| 2020/0139976 A1* | 5/2020 | Magnusson | G01C 21/3822 |
| 2020/0346654 A1* | 11/2020 | Kojo | G08G 1/096888 |
| 2020/0378945 A1* | 12/2020 | Yamamoto | G01N 19/08 |
| 2021/0012131 A1* | 1/2021 | Kim | G06V 20/588 |
| 2021/0339744 A1* | 11/2021 | Rollinger | B60W 30/143 |
| 2022/0169255 A1* | 6/2022 | Sakagami | B60W 40/068 |
| 2022/0343701 A1* | 10/2022 | Kresge | G07C 5/008 |
| 2023/0021644 A1* | 1/2023 | Rollinger | F02D 41/005 |
| 2023/0081887 A1* | 3/2023 | Furuta | G01C 21/165 |
| | | | 701/446 |
| 2023/0107483 A1* | 4/2023 | Konada | B60G 17/016 |
| | | | 701/37 |
| 2023/0243113 A1* | 8/2023 | Kakinuma | G01B 21/30 |
| | | | 702/167 |
| 2023/0358559 A1* | 11/2023 | Iihoshi | G01C 21/3815 |

FOREIGN PATENT DOCUMENTS

| | | | |
|---|---|---|---|
| DE | 102021209131 A1 | 2/2023 | |
| EP | 3705627 A1 * | 9/2020 | G01B 21/30 |
| WO | 2018235239 A1 | 12/2018 | |
| WO | WO-2022229180 A1 * | 11/2022 | |
| WO | WO-2023020898 A1 * | 2/2023 | |

\* cited by examiner

CONNECTED VEHICLE-BASED ROAD SURFACE QUALITY DETERMINATION

INTRODUCTION

The present disclosure relates to determining a road surface quality based on vehicle data received from multiple vehicles.

Characteristics of a road surface being traversed by a vehicle may impact the operation of the vehicle in a number of ways. For example, a vehicle may be operated in one way as it traverses a road surface having certain characteristics and may be operated differently if the road surface had different characteristics. For example, a vehicle traversing a roadway having one or more potholes may be operated at a lower speed than it otherwise would if the road surface was smooth. Road roughness can be classified, for example, to adjust a suspension of the vehicle traversing the road to increase ride comfort, maneuverability, safety, efficiency, and other properties of the vehicle. In addition, road roughness and pothole identification may be used for identification and prioritization of maintenance and repair tasks for road infrastructure.

SUMMARY

A system comprises a computer including a processor and a memory. The memory includes instructions such that the processor is programmed to receive sensor data including at least one of wheel speed measurements, suspension displacement measurements, or tire leak detection data from a vehicle, estimate a rough road measurement based on a deviation of a wheel speed with respect to an average wheel speed, and generate temporal spatial map data indicative of a location and a roughness severity metric of a roadway portion based on the rough road measurement.

In other features, the rough road measurement comprises a function of a sum of absolute deviations of non-driven wheel speeds with respect to the average wheel speed.

In other features, wherein the rough road measurement is calculated based on at least one of a suspension displacement sensor signal or a wheel speed sensor signal.

In other features, wherein the processor is further programmed to improve an estimate of the roughness severity metric by applying a regression function to match a cumulative distribution function for the wheel speed sensor based rough road measurement to a cumulative distribution function for the corresponding suspension displacement sensor based rough road measurement that can then be used to improve the estimates of the roughness severity metrics of other similar vehicles that have only wheel speed sensor based rough road measurements.

In other features, where rough road data is rendered as a map layer, where color and color intensity values rendered within the map layer are indicative of a severity of the roughness severity metric.

In other features, the processor is further programmed to classify a pothole or road bump based on the rough road measurement.

In other features, the processor is further programmed to identify a road safety hazard when a pothole or road bump has been classified higher than a pre-determined calibration threshold and a tire leak rate is higher than a pre-determined calibration threshold.

In other features, the processor is further programmed to estimate when a roadway surface is to exceed a predefined International Roughness Index (IRI) value.

In other features, the processor is further configured to estimate an International Roughness Index (IRI) value by applying a regression function to match a cumulative distribution function for the road roughness metric to a cumulative distribution function for the corresponding International Roughness Index (IRI) value.

In other features, the processor is further configured to predict a future state of a roadway and schedule road repairs for the roadway using a time history of matched rough road measurements and at least one other factor.

A method includes receiving, at a processor, sensor data including at least one of wheel speed measurements, suspension displacement measurements, or tire leak detection data from a vehicle, estimating a rough road measurement based on a deviation of a wheel speed with respect to an average wheel speed, and generating temporal spatial map data indicative of a location and a roughness severity metric of a roadway portion based on the rough road measurement.

In other features, the rough road measurement comprises a function of a sum of absolute deviations of non-driven wheel speeds with respect to the average wheel speed.

In other features, the rough road measurement is calculated based on at least one of a suspension displacement sensor signal or a wheel speed sensor signal.

In other features, the method includes improving an estimate of the roughness severity metric by applying a regression function to match a cumulative distribution function for the wheel speed sensor based rough road measurement to a cumulative distribution function for the corresponding suspension displacement sensor based rough road measurement that can then be used to improve the estimates of the roughness severity metrics of other similar vehicles that have only wheel speed sensor based rough road measurements.

In other features, rough road data is rendered as a map layer, where color and color intensity values rendered within the map layer are indicative of a severity of the roughness severity metric.

In other features, the method includes classifying a pothole based on the rough road measurement.

In other features, the method includes estimating when a roadway surface is to exceed a predefined International Roughness Index (IRI) value.

In other features, the method includes estimating an International Roughness Index (IRI) value by applying a regression function to match a cumulative distribution function for the road roughness metric to a cumulative distribution function for the corresponding International Roughness Index (IRI) value.

In other features, the method includes predicting a future state of a roadway and schedule road repairs for the roadway using a time history of matched rough road measurements and at least one other factor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
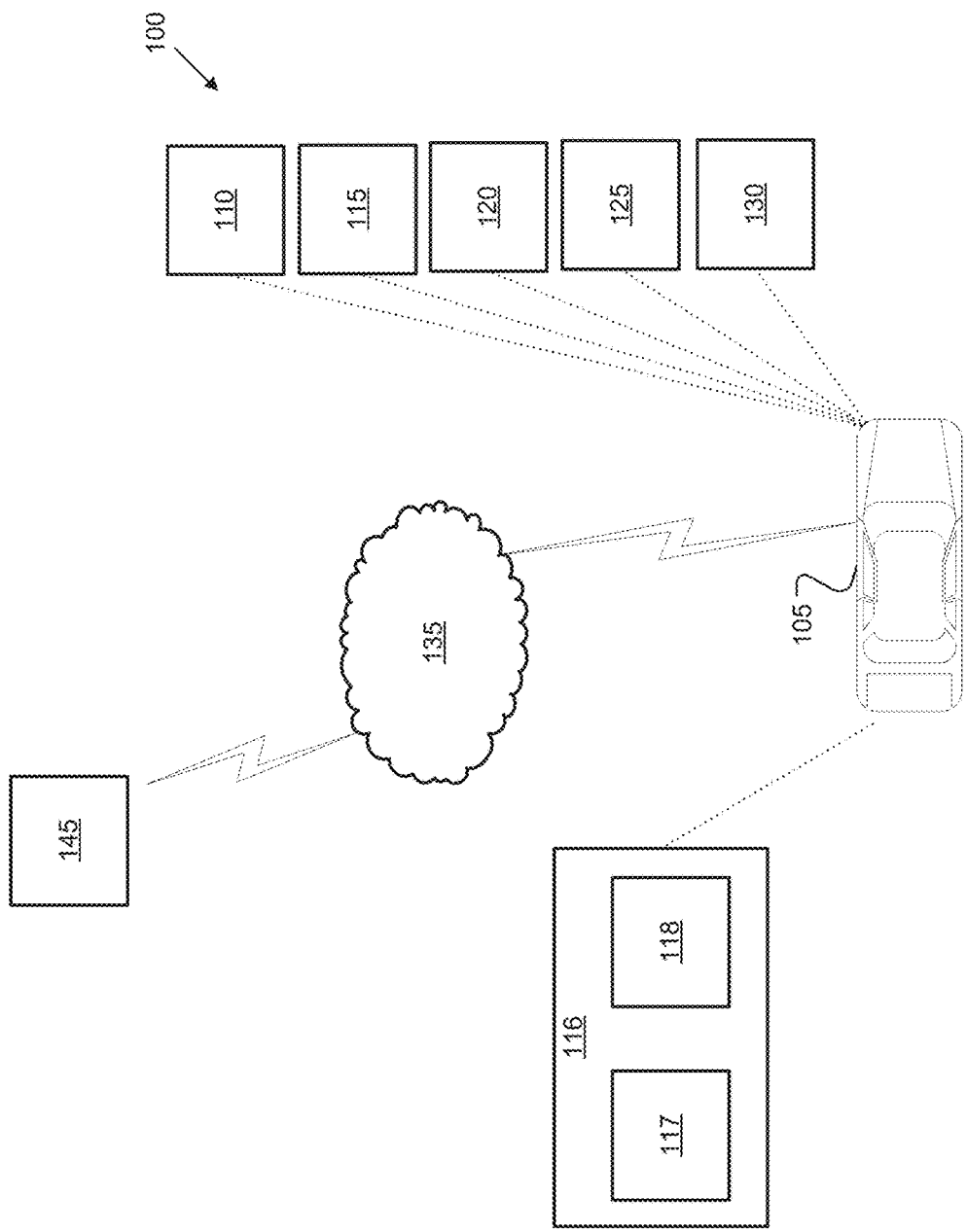
FIG. 1 is a block diagram of an example system of a single vehicle (where a network of vehicles can be used) for estimating a severity of a road surface condition such as low or high roughness or broken pavement or pothole within a roadway.

FIG. 1 is a block diagram of an example vehicle system 100. The system 100 includes a vehicle 105, which is a land vehicle such as a car, truck, etc. The vehicle 105 includes a computer 110, vehicle sensors 115, actuators 120 to actuate various vehicle components 125, and a vehicle communications module 130. Via a network 135, the communications module 130 allows the computer 110 to communicate with a server 145. It is understood that, while only a single vehicle is illustrated, the system environment includes multiple vehicles 105 working together to capture data and transmitting the captured data to a cloud infrastructure.

The computer 110 includes a processor and a memory. The memory includes one or more forms of computer readable media, and stores instructions executable by the computer 110 for performing various operations, including as disclosed herein.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system that uses the Global Position System (GPS). As an example, the computer 110 may request and receive location data of the vehicle 105. The location data may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. In cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide ranging, angle, and range velocity of objects (possibly including second vehicles), etc., relative to the location of the vehicle 105. The vehicle sensors 115 may further include camera sensor(s) 115, e.g., front view, side view, rear view, etc., providing images from a field of view inside and/or outside the vehicle 105.

Vehicle sensors 115 may also include wheel speed sensors that measure speed parameters of the vehicle's 105 wheel, tire pressure monitoring sensors that measure an amount of a pressure within a corresponding vehicle's 105 tire, and/or suspension sensors that measure displacement of the vehicle's 105 suspension relative to a predetermined fixed point. As discussed in greater detail below, the computer 110 can selectively transmit vehicle data that comprises wheel speed rotational data, tire pressure, and/or vehicle 105 suspension displacement to the server 145 to characterize a condition of a roadway.

The vehicle actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc.

Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a suspension component (e.g., that may include one or more active dampers, a ride height system, etc.), a park assist component, an adaptive cruise control component, an adaptive steering component, a movable seat, etc.

In addition, the computer 110 may be configured for two-way communication via a vehicle-to-vehicle communication module or interface 130 with devices outside of the vehicle 105, e.g., through a vehicle to vehicle (V2V) or vehicle-to-infrastructure (V2X) wireless communications to another vehicle, to (typically via the network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

A computer 110 can receive and analyze data from sensors 115 substantially continuously, periodically, and/or when instructed by a server 145, etc. Further, object classification or identification techniques can be used, e.g., in a computer 110 based on wheel speed sensor 115, suspension height sensor 115, lidar sensor 115, camera sensor 115, etc., data, to identify a type of object, e.g., vehicle, person, rock, bicycle, motorcycle, etc., as well as roadway condition, e.g., smooth road, pothole, etc.

Figure 2:
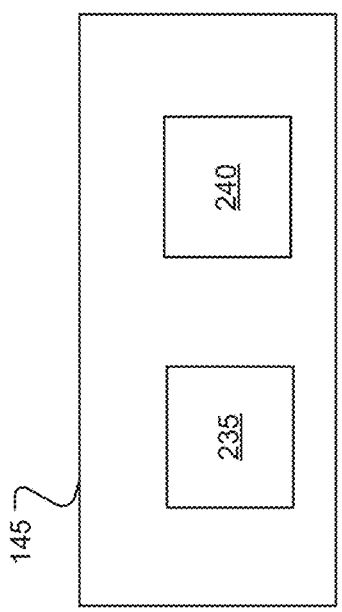
FIG. 2 is a block diagram of an example server within the system.

FIG. 2 is a block diagram of an example server 145. The server 145 includes a computer 235 and a communications module 240. The computer 235 includes a processor and a memory. The memory includes one or more forms of computer readable media, and stores instructions executable by the computer 235 for performing various operations, including as disclosed herein. The communications module 240 allows the computer 235 to communicate with other devices, such as the vehicle 105.

As discussed in greater detail below, the vehicle computer 110 and/or the server 145 generate roadway surface metrics based on sensor data collected by one or more vehicles 105. For example, the server 145 may communicate with multiple vehicles, such as a fleet of vehicles 105. Based on the received sensor data, the server 145 determines the roadway surface metrics, which can include, but is not necessarily limited to, road degradation, such road roughness and/or road surface quality, pothole locations, and/or pothole severity. In some implementations, the server 145 may apply temporal spatial analysis techniques to the received sensor data to generate roadway surface metrics over a defined time period. For example, the server 145 may generate roadway surface metrics that represents roadway surface degradation over the defined time period, e.g., one week, one month, one year, etc.

Figure 3:
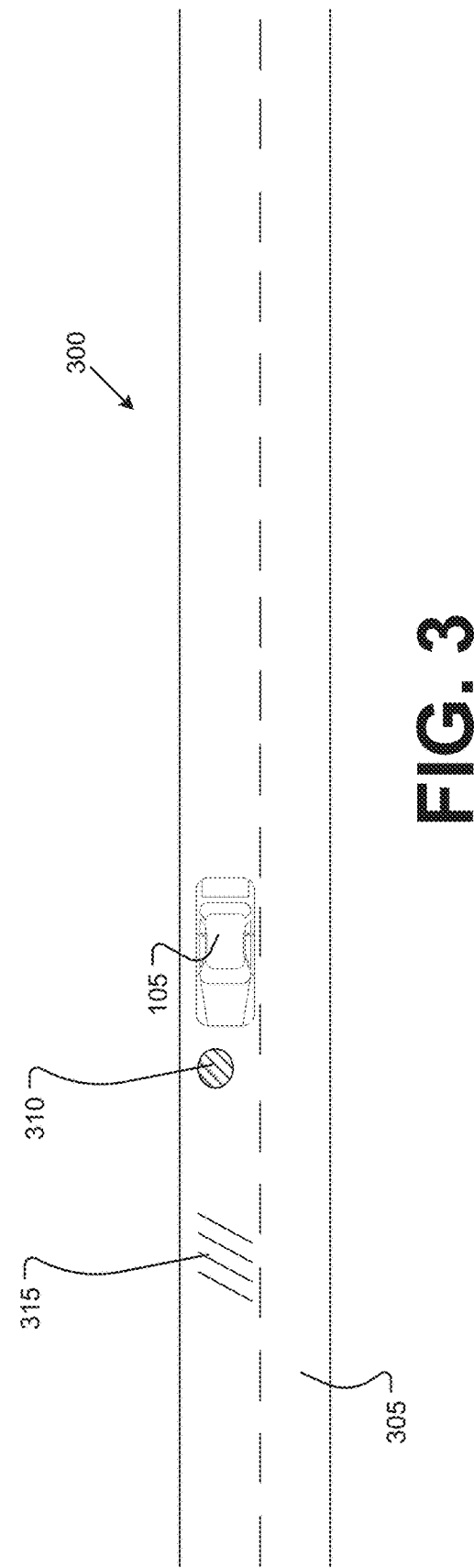
FIG. 3 is an example environment including a vehicle traversing a roadway having a road surface condition or deformity such as potholes or frost heaves.

FIG. 3 illustrates an example environment 300 that includes the vehicle 105 traversing a roadway 305. The roadway 305 may include a roadway obstacle 310, such as a pothole, and include one or more surface deformities 315 representing surface degradation, e.g., a rough road. The sensors 115 can generate data that is selectively transmitted to the server 145, and the server 145 can use the data to generate the roadway surface metrics.

Figure 4:
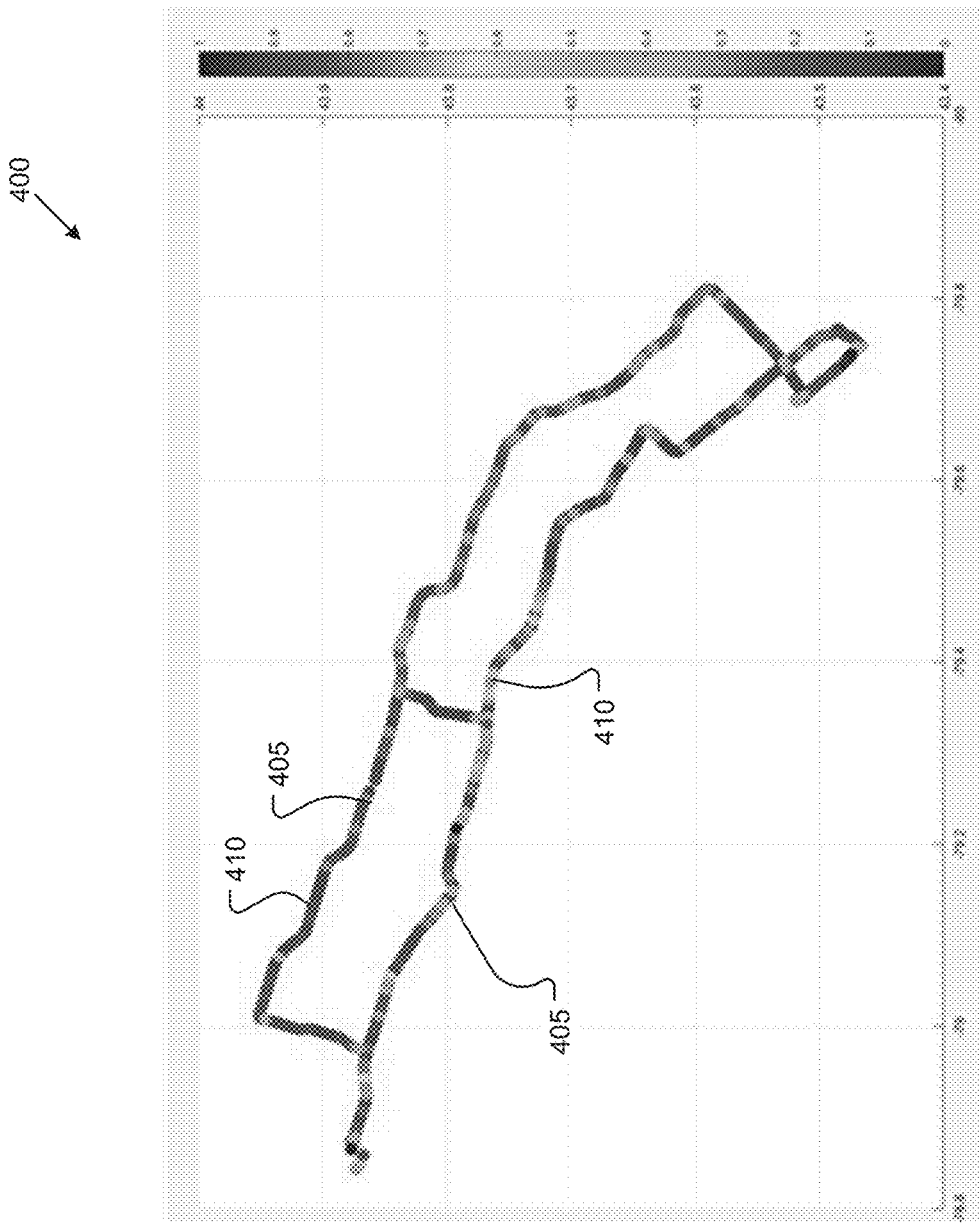
FIG. 4 is an example temporal spatial map including multiple markings indicating road surface condition or deformity such as potholes or frost heaves.

FIG. 4 illustrates an example map 400 depicting one or more roadways 405 and one or more markings 410 that are indicative of the roadway surface metrics. The markings 410 may be positioned over a portion of the roadways 405 to depict a relative location of the roadway surface metrics corresponding to the location within the map 400. A severity of the road surface condition may correspond to a rendering of a map layer, where color and color intensity values, hue of the markings 410, are indicative of the magnitude of the roughness severity metric. For example, a segment of roadway 405 with markings 410 having a relatively darker hue may be defined as a segment of the roadway having greater, i.e., more severe surface deformities 315, e.g., rough road, as compared to markings 410 having a relatively lighter hue. A marking 410 with a very dark hue may be defined as a location of a possible roadway obstacle 310, such as a pothole.

In some implementations, the map 400 may be updated by the server 145 in near real-time or at predetermined periodic time intervals or based on arbitrary events. Once the map 400 is updated, the server 145 can push data representing the updated map 400 to one or more entities, such as governmental entities, business entities, or the like. Governmental entities may comprise local municipalities that are in charge of taking care of the roadway, such as a local department of transportation. Business entities may comprise insurance companies that provide insurance coverage for vehicles, vehicle manufacturers, or the like. In some instances, the server can push data representing the updated map 400 to the vehicle 105 via the network 135.

In some instances, based on the configuration of the vehicle 105, one or more vehicle components 125 can be actuated based on data within the map 400. For example, the computer 110 can transmit control signals to the vehicle actuators 120 to cause the vehicle 105 to alter a vehicle direction, alter a vehicle speed, alter a vehicle suspension damping profile, or the like based on the presence or the absence, i.e., recently repaired, of a roadway obstacle 310 and/or surface deformities 315. In some examples, the computer 110 can cause the map 400 to be displayed via a display within the vehicle 105, such as the HMI. In some examples, in-vehicle notifications, such as audio cues or voice messages, can be provided.

The server 145 is configured to receive sensor data from multiple vehicles and estimate the roadway surface metrics. In an example implementation, the computer 110 can send selected sensor data to the server 145 as discussed in greater detail herein.

Within the present disclosure, the computer 110 transmits sensor data representing wheel speed measurements to the server 145. The computer 110 can also transmit vehicle type data, e.g., data indicative of the vehicle make and model, to the server 145. Based on the sensor data, the vehicle 105 can determine rotational speed deviations that represent one or more roadway surface metrics that comprise a rough road measurement (RRM). In an example implementation, the rough road measurement for each vehicle comprises a function of a sum of absolute deviations of non-driven wheel speeds with respect to an average wheel speed, as defined in Equation 1:

$$RRM = f(\Sigma_{i=1}^{2} abs(x_i))  \quad \text{Eq. 1,}$$

where RRM comprises the rough road measurement, abs represents the absolute value, x represents the deviation of wheel speed of a non-driven wheel speed from an average wheel speed, e.g., average non-driven wheel speed, i represents one of the non-driven wheels, and the function f( ) is a transformation function, such as a band-pass filter.

In another example implementation, RRM for each vehicle is calculated using wheel speed sensor signals, as defined in Equation 2:

$$RRM = K*F(Max\{abs[WSS_{RR} - WSS_{RF}], abs[WSS_{RR} - WSS_{LF}], abs[WSS_{RR} - WSS_{LR}], abs[WSS_{RF} - WSS_{LF}], abs[WSS_{RF} - WSS_{LR}], abs[WSS_{LF} - WSS_{LR}]\} \quad \text{Eq.2,}$$

where WSS represents wheel speed sensor signal. The indices RR, RF, LF, LR represent Right Rear, Right Front, Left Front, and Left Rear wheels, respectively. Max represents a function that selects the maximum value of a list of values for a specific time window, Function F( ) is a transformation function, such as a band-pass filter, and K is a scaling factor.

In various implementations, the computer 235 normalizes the RRM according to the vehicle type due to a number of factors, e.g., wheel dimensions, vehicle size, suspension configurations, etc. For example, the computer 235 can access a lookup table that relates a vehicle type to a normalization factor. The normalization factor can be applied to the RRM to mitigate bias caused by difference in vehicle types.

The RRM can be indicative of a roughness severity metric for a portion of a roadway. As discussed below, the server 145 uses calculated RRMs from plurality of vehicles to generate temporal spatial map data indicative of the roughness severity metric for each road portion or segment. The roughness severity metric can be defined as a quantitative value representing how degraded a portion of a roadway surface is.

The vehicle 105 can also include sensors 115 and/or components 125 that comprise continuous damping control (CDC) chassis and suspension technology, magnetic ride control chassis and suspension technology, air suspension chassis and suspension technology, or ride height chassis and suspension technology. Sensors 115 associated with the chassis and suspension technology can provide data representing a distance or acceleration that a suspension, i.e., suspension displacement or acceleration, of the vehicle 105 relative to the body of the vehicle 105. For example, a suspension of the vehicle 105 may experience greater changes in distance or acceleration when the vehicle 105 is traversing a roadway having greater surface degradation relative to a roadway having less surface degradation.

In another example implementation, RRM for each vehicle is calculated using each suspension displacement sensor signal as defined in Equation 3:

$$RRM = K*F\left(\frac{\sum_{i=1}^{N-1} |x_i - x_{i-1}|}{\sum_{i=1}^{N-1} f(y_i - y_{i-1})}\right), \quad \text{Eq. 3}$$

where $x_i$ denotes the ith suspension displacement measurement and $y_i$ denotes the ith sampling location along the road segment where N measurement samples have been collected, and $f(y_i - y_{i-1})$ denotes a travel distance between sampling locations $y_i$ and $y_{i-1}$.

The vehicle 105 can also include sensors 115 capable of generating data indicative of tire pressure and tire temperature. As shown in FIG. 1, a tire leak system 116 capable of detecting tire leak and predicting the time and/or distance the at least one of the one or more tires will become unusable. The tire leak detection system 116 can determine whether one or more tires of the vehicle 105 are experiencing loss of air, that can be indicative of a tire leak, based on data received from the sensors 115. The data can be transmitted to the server 145 such that the server 145 can determine a time and a location where the tire leak started.

The tire leak detection system 116 includes one or more tires, a memory, a processor coupled to the memory, a sensor engine, a leak detection engine 117, and a leak rate prediction engine 118. The tire leak detection system 116 is operable to receive sensor data from the one or more tire pressure sensors 115. The tire leak detection system 116 is further operable to determine an occurrence of a leak anomaly in at least one of the one or more tires based on the sensor data. The tire leak detection system 116 is further operable to output data to the server 145, indicating a leak type and the data indicating the most accurate leak rate estimation. This data is used by the server 145 for determining retrospectively the time and location where tire leak started.

The leak detection engine 117 can detect a tire leak based on a probabilistic anomaly-detection approach that utilizes the sensor 115 data. The leak detection engine 117 can utilize a tire-leak detection metric to compensate for tire pressure and volume variations due to changes in tire temperature. The tire-leak detection metric can be based on Equation 4:

$$P** = (P/T)*T_{ref} - B(P)*(T - T_{ref}) \quad \text{Eq.4,}$$

where $P**$ is the tire-leak detection metric, P is tire pressure, T is tire temperature, $T_{ref}$ is a reference temperature, and B is a function of the tire pressure. For example, B can be a linear function of the tire pressure in a form of: $B = a*P + b$ where a and b are calibratable values. If the difference between mean value of the reference recursive weighted distribution of the tire-leak detection metric and a new sample mean of the tire-leak detection metric is greater than the predetermined multiple of the reference recursive weighted standard deviation of the tire-leak detection metric, the tire leak detection system determines that a leak anomaly has occurred in the one or more tires and can predict a tire leak behavior for the one or more tires.

The leak rate prediction engine 118 calculates rate of change of the tire-leak detection metric with respect to time as well as the predicted time since the start of the leak for a tire using based on at least three prediction models (e.g., sonic, exponential, and linear). The prediction models can be applied in a recursive manner. Results from each of the prediction models can be compared with each other. In one embodiment, the model that has the least prediction residual error can be selected for use when determining retrospectively the time and location where tire leak started.

The server 145 is further operable to determine a GPS location that tire leak has occurred for at least one of the one or more tires. The server 145 can use the data from tire leak detection system 116 and the vehicle's 105 historical GPS location data to retrodict retrospectively the leak duration and location where the tire leak started.

During operation, one or more vehicles 105 can transmit sensor data to the server 145 via the network 135. The sensor data can include, but is not limited to, wheel speed measurement data, suspension distance data, and/or tire leak data. The server 145 can use the received sensor data to estimate the roadway surface metrics as discussed herein.

Figure 5A:
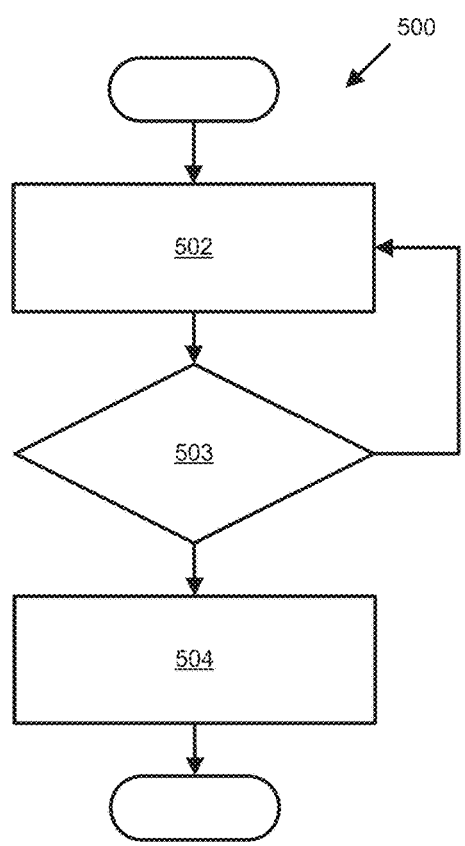
FIG. 5A is a flow diagram illustrating an example edge-based process for computing RRM and determining when to collecting, storing, and transmitting data.

FIG. 5A is a flow chart of an example edge-based process 500 for computing RRM and determining when to collect, store, and transmit data to the server 145. Blocks of process 500 can be executed by the computer 110 of vehicle 105. At block 502, the computer 110 calculates Road Roughness Measurement (RRM) at a pre-determined periodic cycle using wheel speed sensor signals or suspension displacement sensor signals.

At block 503, the computer 110 compares the calculated RRM with a calibration threshold that is predetermined for the vehicle 105 type and architecture. The threshold is defined based on a lookup table as a function of vehicle 105 type, architecture, and speed. If the RRM exceeds the threshold, the process 500 proceeds to block 504. Otherwise, the process 500 returns to block 502.

At block 504, the computer 110 stores for a pre-determined duration of time the vehicle data such as vehicle speed, acceleration, RRM, wheel speed data, suspension sensor data, GPS location data, vehicle heading data, and/or tire leak data among others. The data is uploaded to the server 145 after the data collection is complete, if the vehicle is turned off, and/or if the data storage is full.

Figure 5B:
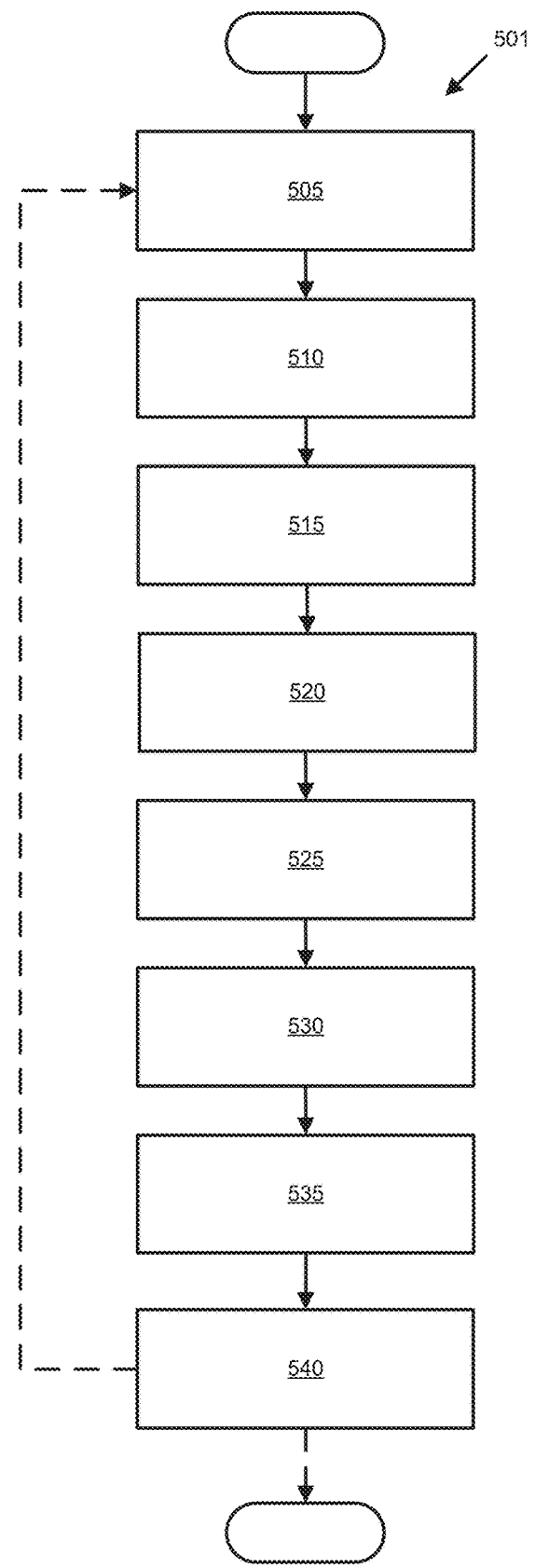
FIG. 5B is a flow diagram illustrating an example process for estimating a location and road roughness severity metric fora roadway condition and/or roadway deformity.

FIG. 5B is a flow chart of an example process 501 for detecting and/or determining a severity of a roadway obstacle 310 and/or surface deformities 315. Blocks of the process 501 can be executed by the computer 235 of the server 145. The process 501 begins at block 505 in which sensor data is received. For example, the computer 235 can receive sensor data from one or more vehicles 105 via the network 135. The vehicle data can comprise GPS data (latitude, longitude, and heading), RRM data, wheel speed data, suspension data, and/or tire pressure data and tire leak data. As discussed above, the server 145 may receive vehicle data from multiple vehicles, such as a fleet of vehicles. In some instances, the computer 235 and/or the computer 110 may anonymize the data to remove data that could be used to identify the vehicle 105. For instance, the computer 110 may remove any vehicle identification data prior to transmitting the sensor data.

At block 510, the computer 235 normalizes the vehicle data based on e.g., vehicle speed and/or vehicle type, etc. For example, the server 145 can include a lookup table that relates vehicle speed and/or vehicle type to a normalization factor. The normalization factor can be determined using suitable empirical techniques. At block 515, the computer 235 filters the normalized sensor data based on vehicle heading parameters. For example, the computer 235 may further filter the normalized sensor data to select normalized vehicle data having similar vehicle heading parameters, e.g., vehicles that are heading in the same direction. At block 520, the computer 235 can apply suitable clustering techniques to group the normalized sensor data. Suitable clustering techniques can include, but are not necessarily limited to, centroid-based clustering, distribution-based clustering, density-based clustering, unsupervised machine learning methods, or the like. The clustering can be done based on the normalized signal from the vehicle, its GPS location (latitude, and longitude), and vehicle heading. This way, even with common errors found in GPS, we would be able to distinguish between vehicles signals that are very close to each other but going in different lanes. A third dimension in the clustering can be added to account for elevation using vehicle pitch information and other sensors, as it is common to have bridges, overpasses, and other road networks that may have vehicles on the same GPS location and heading, but at different altitudes.

At block 525, the computer 235 determines roadway surface metrics for each road segment based on the normalized sensor data from a plurality of vehicles. For example, the computer 235 can access a lookup table that relates sensor data to roadway surface metrics. The roadway surface metrics can be related to sensor data based on empirical analysis. In some instances, a neural network, such as a deep neural network, can be used to relate sensor data to roadway surface metrics.

At block 530, the computer 235 generates and/or updates a temporal spatial map, such as the temporal spatial map 400 illustrated in FIG. 4. In an example implementation, the computer 235 retrieves map data corresponding to the location data of the vehicle 105. Using the retrieved map data, the computer 235 associates roadway surface metrics, such as a roughness severity metric based on the RRM, to one or more roadway segments such that one or more markings are included in the temporal spatial map 400. The computer 235 may further cross reference the roadway surface metrics with locations of sewer holes and/or train tracks such that one or more markings are not included. For example, determined locations of roadway surface metrics can be cross-referenced with known locations of sewer holes and/or train tracks. By cross-referencing the locations of roadway surface metrics with known locations of sewer holes and/or train tracks, the computer 235 may not include markings indicative of the roadway surface metrics since sewer holes and/or train tracks are not indicative of roadway degradation. The computer 235 may store roughness severity metric data, GPS location and temporal data for sewer holes and/or train tracks to be able to derive insights on degradation of these road infrastructure components over time. In some instances, the computer 235 retrieves the sewer hole and/or train track location data via a suitable application programming interface (API).

At block 535, the computer 235 can classifies the roadway surface metrics as a pothole and/or a pothole severity. The computer 235 classifies the pothole and/or the pothole severity using the roughness severity metric. In an example implementation, the computer 235 can access a lookup table that relates the roughness severity metric to pothole severity. The pothole severity may be populated in the lookup table according to empirical analysis of various pothole types corresponding to sensor data. The computer 235 may also classify the roadway degradation as a pothole when the location of the road degradation does not correspond to a location of a train track and/or a sewer hole. The pothole location can be determined by the computer 235 based on location data that corresponds to the vehicle data indicative of the pothole severity. Various markings that are displayed within the map can indicate a severity of the estimated road roughness metric. For example, markings having a first hue may be considered to be of greater severity than markings having a second hue. The server 145 can transmit the updated temporal spatial map to one or more vehicles 105 after the computer 235 updates the temporal spatial map data.

At block 540, the computer 235 determines whether the roughness severity metric from block 535 is higher than a pre-determined calibration threshold and if it corresponds to the GPS location for the initiation of a tire leak rate from leak prediction engine 118, higher than a pre-determined calibration threshold. In such a scenario, the process 500 determines that a road safety hazard has been identified and a corresponding marking is overlayed on the map. The process may then terminate or, in alternative, return to block 505.

Figure 6:
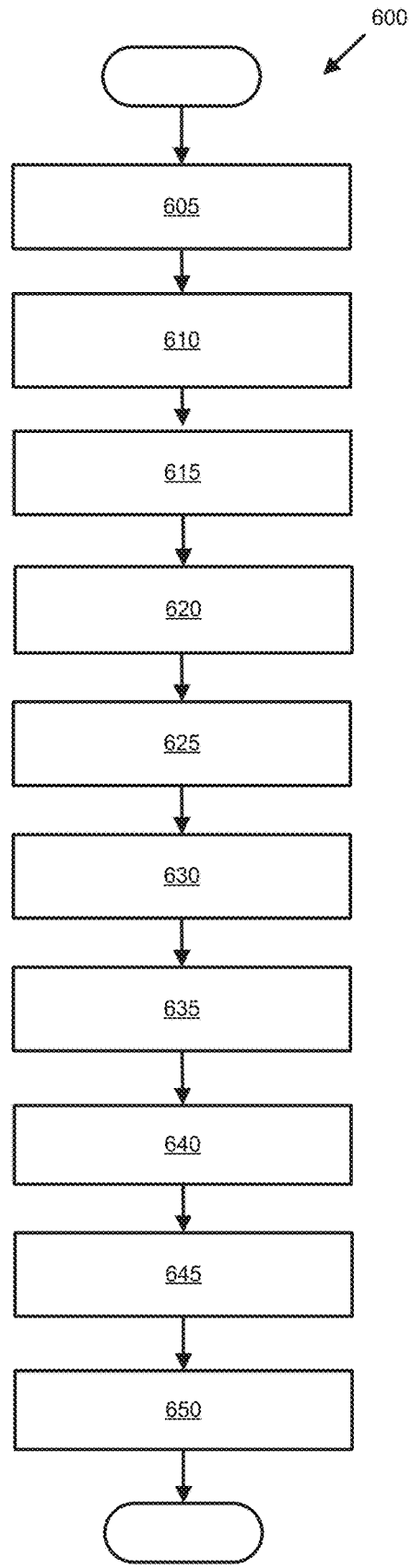
FIG. 6 is a flow diagram illustrating an example process for predicting road degradation for each road segment based on a rough road measurement (RRM)

FIG. 6 is a flow chart of an example process 600 for determining IRI roadway degradation based on a rough road measurement (RRM) to enable insights on current and future roadway maintenance needs. Blocks of the process 600 can be executed by the computer 235. The process 600 begins at block 605 in which sensor data is received. For example, the computer 235 can receive sensor data from one or more vehicles 105 via the network 135.

At block 610, the computer 235 calculates a probability mass function (PMF) using the rough road measurement (RRM) obtained from multiple vehicles 105. The rough road measurement can be normalized prior to calculation according to e.g., vehicle type, etc. The probability mass function can be calculated for a particular roadway segment over a defined time period, e.g., one (1) day, two (2) days, one (1) week, one (1) month, etc. The roadway segment can be defined as a predefined portion of roadway, e.g., one hundred (100) feet, one hundred (100) meters, two hundred (200) feet, two hundred (200) meters, etc. In some examples, the roadway segment may be defined according to roadway segments defined by a governmental entity, such as a Department of Transportation. In other examples, the roadway segments may be defined according to the operator of the server 145.

At block 615, the computer 235 accesses a probability density function (PDF) of international roughness index (IRI) values, where available. The computer 235 can obtain the PDF of the IRI based on the pre-recorded IRI data values using standard IRI measurement tools. At block 620, the computer 235 can truncate the RRM PMF and the IRI PDF. For example, the computer 235 truncates the lower and the upper ends, e.g., values below ten percent (10%) and values above ninety percent (90%) of the RRM PMF, to remove data that may be potential outliers.

At block 620, the computer 235 generates the RRM PMF and the IRI PDF with the truncated data. At block 625, the computer 235 generates a cumulative distribution function (CDF) for RRM using the RRM PMF and generates a cumulative distribution function (CDF) for IRI using the IRI PDF.

Figure 8:
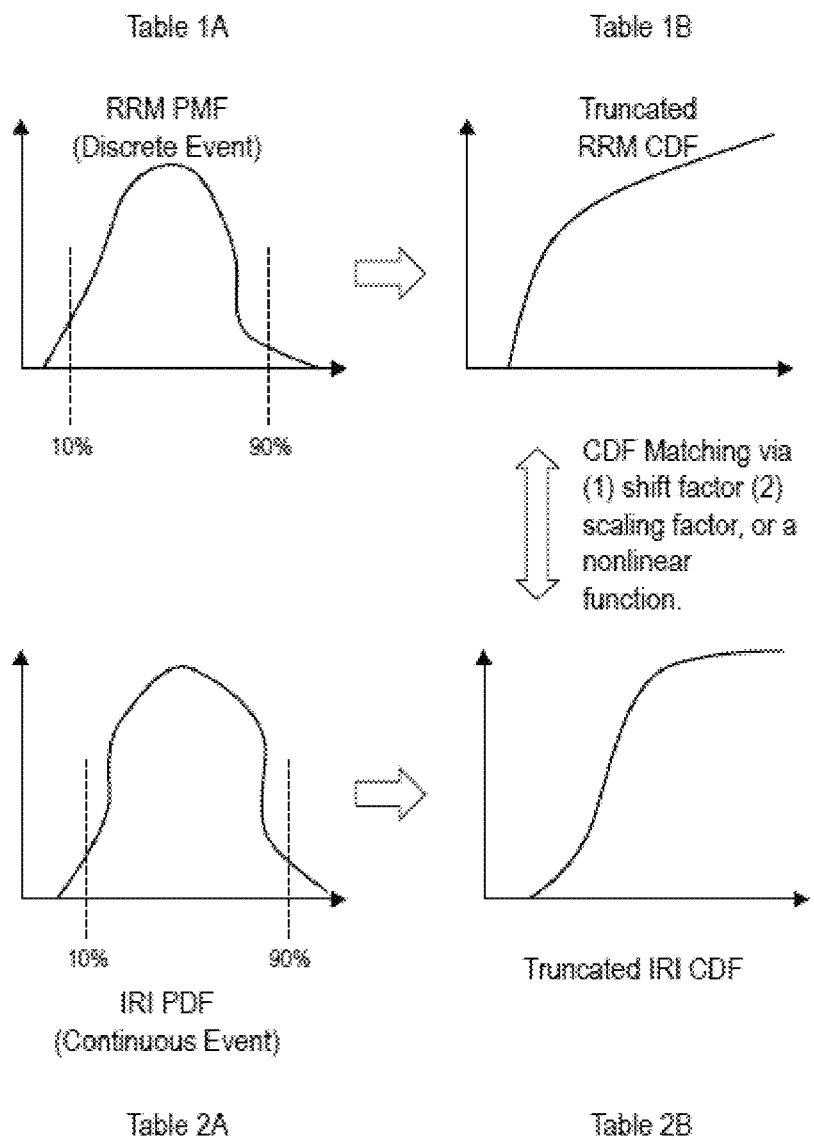
FIG. 8 is a diagram showing Tables 1A, 1B, 2A, and 2B that illustrate example plots of RRM PMF and RRM CDF and of IRI PDF and IRI CDF.

At block 630, the computer 235 matches the RRM CDF to the IRI CDF. For example, the computer 235 can use a regression function, such as a linear regression function (y=a*x+b) or a nonlinear regression function (y=a*f(x)+b, f(x) is nonlinear function), to match RRM CDF to the IRI CDF. In both equations, y and x are IRI value and road roughness metric, respectively, when their cumulative probabilities are equal. Therefore, with road roughness metric x, the estimated IRI value y can be calculated. As shown in FIG. 8. Tables 1A and 1B illustrate example plots of RRM PMF and RRM CDF, and Tables 2A and 2B illustrate example plots of IRI PDF and IRI CDF.

At block 635, the computer 235 estimates when the roadway surface metric exceeds a threshold. For example, the computer 235 can estimate when the matched roadway surface metric defined by the RRM will exceed a predefined IRI roadway value, e.g., indicative of when the roadway surface should be replaced or repaired. At block 640, the estimated roadway surface metric is transmitted to one or more entities. For example, the estimated roadway surface metric can be transmitted to a particular governmental entity that oversees the particular roadway segment. The delivery can be in the form of web portal, digital report, or notifications etc.

At block 645, the computer 235 estimates the time in future when the roadway surface metric will exceed a threshold. For example, the computer 235 can estimate when the matched roadway surface metric defined by the RRM will exceed a predefined IRI roadway value, e.g., indicative of when the roadway surface will have to be replaced or repaired based on the following equation:

$$RRM(t) = F\left(H_{Pavement}, C_{Climate}, \frac{\partial RRM}{\partial t}, RRM\right), \quad \text{Eq.5}$$

where RRM(t) is the matched road surface metric for a specific target road segment as a function of time t and $$\frac{\partial RRM}{\partial t}$$

is the rate of change of the RRM with respect to time. $H_{Pavement}$ is a parameter that represents the material construction of the pavement and $C_{Climate}$ is a parameter that represents the climate severity and precipitation for the target road segment, respectively. F(•) is a linear or nonlinear extrapolation function. For example, F(•) can be an exponential function such as the following:

$$RRM(t) = Ae^{(H_{Pavement}*C_{Climate}*t)} \quad \text{Eq.6,}$$

where A is the current value of the matched road service metric. At block 650, the predicted state of the roadway surface metric is transmitted to one or more entities. The process 600 then ends.

Figure 7:
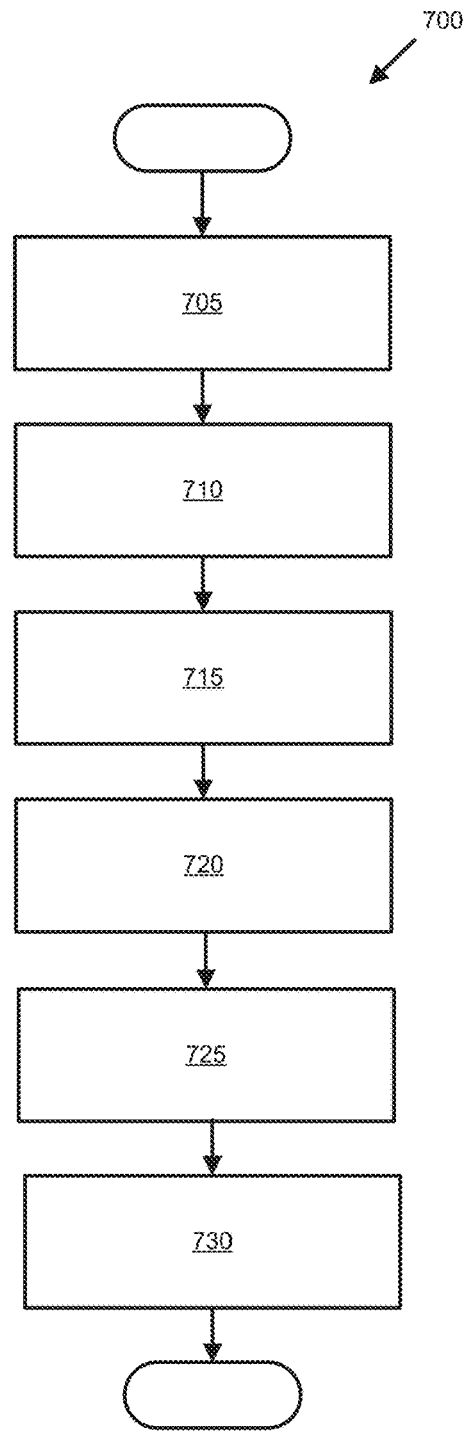
FIG. 7 is flow diagram illustrating an example process for calibrating wheel speed based rough road measurement (RRM) using suspension displacement based rough road measurement (RRM).

FIG. 7 is a flow chart of an example process 700 for calibrating wheel speed based rough road measurement (RRM) using suspension displacement based rough road measurement (RRM). Blocks of the process 700 can be executed by the computer 235. The process 700 begins at block 705 in which sensor data is received. For example, the computer 235 can receive sensor data from one or more vehicles 105 via the network 135.

At block 710, the computer 235 calculates a probability mass function (PMF) using the wheel speed based rough road measurement (RRM) obtained from multiple vehicles 105 using their wheel speed sensor signals. The rough road measurement can be normalized prior to calculation according to vehicle type. The probability mass function can be calculated for a particular roadway segment over a defined time period.

At block 715, the computer 235 calculates a probability mass function (PMF) using the suspension displacement based rough road measurement (RRM) obtained from multiple vehicles 105 using their suspension displacement sensor signals. The rough road measurement can be normalized prior to calculation according to e.g., vehicle type, etc. The probability mass function can be calculated for the same roadway segment and defined time period as the probability mass function (PMF) using wheel speed based rough road measurement (RRM).

At block 720, the computer 235 can truncate the suspension displacement based RRM PMF and the wheel speed based rough road measurement RRM PMF. For example, the computer 235 truncates the lower and the upper ends, e.g., values below ten percent (10%) and values above ninety percent (90%) of the RRM PMF, to remove data that may be potential outliers.

At block 725, the computer 235 generates a cumulative distribution function (CDF) for suspension displacement based RRM and the wheel speed based rough road measurement RRM.

At block 730, the computer 235 matches the wheel speed based rough road measurement RRM CDF to the suspension displacement based RRM CDF. For example, the computer 235 can use a regression function, such as a linear regression function (y=a*x+b) or a nonlinear regression function (y=a*f(x)+b, f(x) is nonlinear function). In both equations, y and x are suspension displacement based RRM and the wheel speed based rough road measurement RRM, respectively, when their cumulative probabilities are equal. The calibration of the wheel speed based rough road measurement RRM to the suspension displacement based RRM enables improved estimation of the RRM using wheel speeds.

The description of the present disclosure is merely exemplary in nature and variations that do not depart from the gist of the present disclosure are intended to be within the scope of the present disclosure. Such variations are not to be regarded as a departure from the spirit and scope of the present disclosure.

In general, the computing systems and/or devices described may employ any of a number of computer operating systems, including, but by no means limited to, versions and/or varieties of the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising a computer including a processor and a memory, the memory including instructions such that the processor is programmed to:
   receive sensor data including wheel speed measurements, tire leak detection data, and GPS data from a vehicle;
   estimate a rough road measurement based on a function of a sum of absolute deviations of non-driven wheel speeds with respect to an average wheel speed from the wheel speed measurements;
   generate a temporal spatial map indicative of a location and a roughness severity metric of a roadway portion based on the rough road measurement and the GPS data;
   determine that a tire leak anomaly has occurred from the tire leak detection data by determining a tire-leak detection metric according to the following equation:

$$P^{**} = (P/T) * T_{ref} - B(P) * (T - T_{ref})$$

where $P^{**}$ is the tire-leak detection metric, P is a tire pressure, T is a tire temperature, $T_{ref}$ is a reference temperature, and B is a function of the tire pressure based on calibratable values, where if the difference between a mean value of a reference recursive weighted distribution of the tire-leak detection metric and a new sample mean of the tire-leak detection metric is greater than the predetermined multiple of the reference recursive weighted standard deviation of the tire-leak detection metric, the tire leak anomaly has occurred in the one or more tires;
   calculate a rate of change of the tire-leak detection metric with respect to time;
   determine a GPS location that the tire leak anomaly started based on the rate of change of the tire-leak detection metric and the GPS data of the vehicle;
   cross-reference the roughness severity metric with predetermined locations of sewer holes and train tracks;
   exclude markings of the roughness severity metric on the temporal spatial map that correspond to the sewer holes and the train tracks; and
   identify a road safety hazard when the roughness severity metric is higher than a pre-determined calibration threshold and when the roughness severity metric corresponds to the GPS location that the tire leak anomaly started.

2. The system of claim 1, wherein the rough road measurement is calculated based on a wheel speed sensor signal.

3. The system of claim 2, wherein the processor is further programmed to improve an estimate of the roughness severity metric by applying a regression function to match a cumulative distribution function for the wheel speed sensor based rough road measurement to a cumulative distribution function for a corresponding suspension displacement sensor based rough road measurement that can then be used to improve the estimates of the roughness severity metrics of other similar vehicles that have only wheel speed sensor based rough road measurements.

4. The system of claim 1, wherein rough road data is rendered as a map layer, where color and color intensity values rendered within the map layer are indicative of a severity of the roughness severity metric.

5. The system of claim 1, wherein the processor is further programmed to estimate when a roadway surface is to exceed a predefined International Roughness Index (IRI) value.

6. The system of claim 5, wherein the processor is further programmed to estimate an International Roughness Index (IRI) value by applying a regression function to match a cumulative distribution function for the roughness severity metric to a cumulative distribution function for the corresponding International Roughness Index (IRI) value.

7. The system of claim 1, wherein the processor is further configured to predict a future state of a roadway and schedule road repairs for the roadway using a time history of matched rough road measurements and at least one other factor.

8. A method comprising:
   receiving, at a processor, sensor data including wheel speed measurements, tire leak detection data, and GPS data from a vehicle;
   estimating a rough road measurement based on a function of a sum of absolute deviations of non-driven wheel speeds with respect to an average wheel speed from the wheel speed measurements;
   generating a temporal spatial map indicative of a location and a roughness severity metric of a roadway portion based on the rough road measurement and the GPS data;

determining that a tire leak anomaly has occurred from the tire leak detection data by determining a tire-leak detection metric according to the following equation:

$$P^{**}=(P/T)*T_{ref}-B(P)*(T-T_{ref})$$

where $P^{**}$ is the tire-leak detection metric, P is a tire pressure, T is a tire temperature, $T_{ref}$ is a reference temperature, and B is a function of the tire pressure based on calibratable values, where if the difference between a mean value of a reference recursive weighted distribution of the tire-leak detection metric and a new sample mean of the tire-leak detection metric is greater than the predetermined multiple of the reference recursive weighted standard deviation of the tire-leak detection metric, the tire leak anomaly has occurred in the one or more tires;

calculating a rate of change of the tire-leak detection metric with respect to time;

determining a GPS location that the tire leak anomaly started based on the rate of change of the tire-leak detection metric and the GPS data of the vehicle;

cross-referencing the roughness severity metric with predetermined locations of sewer holes and train tracks;

excluding markings of the roughness severity metric on the temporal spatial map that correspond to the sewer holes and the train tracks; and identifying a road safety hazard when the roughness severity metric is higher than a pre-determined calibration threshold and when the roughness severity metric corresponds to the GPS location that the tire leak anomaly started.

9. The method of claim 8, wherein the rough road measurement is calculated based on a wheel speed sensor signal.

10. The method of claim 9, wherein the method further comprises improving an estimate of the roughness severity metric by applying a regression function to match a cumulative distribution function for the wheel speed sensor based rough road measurement to a cumulative distribution function for a corresponding suspension displacement sensor based rough road measurement that can then be used to improve the estimates of the roughness severity metrics of other similar vehicles that have only wheel speed sensor based rough road measurements.

11. The method of claim 8, wherein rough road data is rendered as a map layer, where color and color intensity values rendered within the map layer are indicative of a severity of the roughness severity metric.

12. The method of claim 8, further comprising estimating when a roadway surface is to exceed a predefined International Roughness Index (IRI) value.

13. The method of claim 12, further comprising estimating an International Roughness Index (IRI) value by applying a regression function to match a cumulative distribution function for the roughness severity metric to a cumulative distribution function for the corresponding International Roughness Index (IRI) value.

14. The method of claim 8, further comprising predicting a future state of a roadway and schedule road repairs for the roadway using a time history of matched rough road measurements and at least one other factor.

\* \* \* \* \*